July 16, 1957  J. F. REUS  2,799,115

CASTING-OFF DEVICE FOR FISHING LINE

Filed June 1, 1954

JAMES F. REUS
*INVENTOR.*

BY *Howard J. Whelan.*
ATTORNEY

United States Patent Office 2,799,115
Patented July 16, 1957

2,799,115

CASTING-OFF DEVICE FOR FISHING LINE

James F. Reus, Perry Point, Md.

Application June 1, 1954, Serial No. 433,489

3 Claims. (Cl. 43—43.12)

This invention relates to an item of fishing tackle, and particularly to an attachment for releasably securing a sinker or weightable substance to a fishing line, whereby the line, bait or lure and sinker may be cast a considerable distance and the sinker, or weightable substance released when the line and said sinker or weightable substance, strikes the water so that the bait or lure will remain at or near the surface of the water.

In certain types of game fishing, for example fishing with live bait or lure, for yellowtail, barracuda, small tuna and other game fish, it is desirable to cast the baited hook or lure a considerable distance from the boat or surf and it is also desirable that at the conclusion of the cast the line and bait or lure remain at or near the surface of the water, as such location has been found by experience to offer the best location for hooking the fish. The live bait or lure ordinarily used in this type of fishing is not heavy enough to enable a long cast to be made and it cannot be whipped back and forth as in fly casting. If a stationary or permanent weight is attached to the line or to the leader near the live bait or lure to facilitate casting, such a weight pulls the line and live bait or lure downward immediately upon striking the water, and carries the bait or lure below the region where the yellowtail or other fish normally strike. We use yellowtail only as an example, there being as already explained several other fish which will strike live bait or lure at or near the surface of the water but do not ordinarily feed at a depth to which a stationary or permanent sinker would carry the bait.

It is an object of this invention to provide means for attaching a sinker or weightable substance to a fishing line which will be severed upon the sinker or weightable substance striking the water and dissolving a connecting unit so that the sinker will fall to the bottom, leaving the line and the bait or lure floating at or near the surface of the water, within the area where the cast is completed.

A further object of the invention is to provide by means of a device of the character described, automatic means for severing the connection of a sinker or weightable substance to the line, actuated by the presence of water dissolving the connecting unit or means.

An additional object of this invention is to provide mechanical means and physical properties of a dissolvable tablet to release a sinker or weightable substance from a fishing line after it strikes the water.

A further object of this invention is to provide a new and improved fishing tackle having a weight release comprising the physical properties of a substance which dissolves readily in water and the mechanical action of the spring loaded lever to release the weight.

A still further object of this invention is to provide a new and improved method of surf fishing wherein the tackle will be kept off the bottom by releasing the weight upon hitting the water, enabling the fisherman to use a lure which floats, or runs close to the surface.

Other objects will become apparent as the invention is more fully set forth.

For a clearer understanding of the invention and its objects, reference is made the accompanying drawings which, together with the following description form a disclosure of embodiments of the invention, while the appended claims emphasize the scope thereof.

Figure 1:
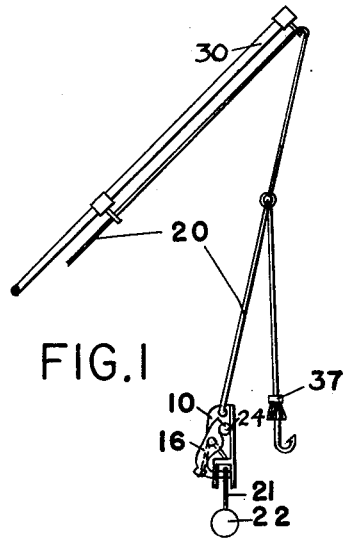
Figure 1 is a side elevation of a casting device embodying this invention, attached to a fishing line using artificial bait.
Figure 2:
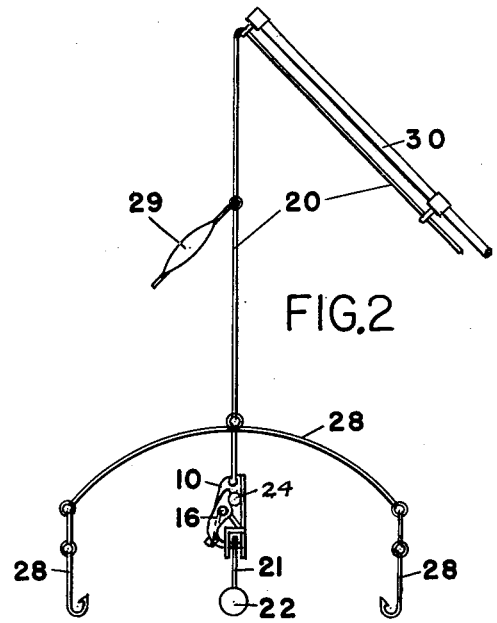
Figure 2 is a side elevation of a casting off device embodying this invention attached to a fishing line using a spreader-bait rig for drift fishing.
Figure 3:
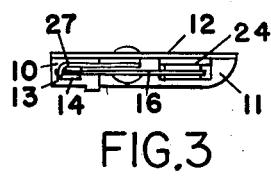
Figure 3 is a plan view of the casting-off device.
Figure 6:
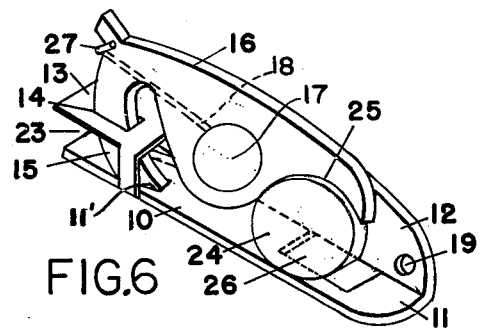
Figure 6 is an enlarged perspective view similar to Fig. 4. Similar reference characters refer to similar parts throughout the drawings.
Figure 4:
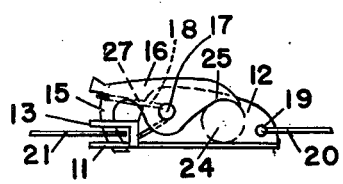
Figure 4 is a side elevation of Figure 3 in closed or cocked position holding the weight.
Figure 5:
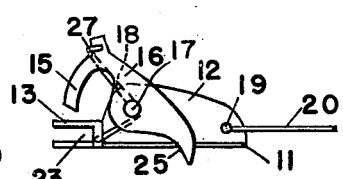
Figure 5 is a view similar to Fig. 4 after releasing the weight.

In the construction shown in the drawings the trigger mechanism 10 comprises a base 11 and side wall 12, the base is provided with a raised member 13 having a slot 14 in its upper portion to receive the end 15 of the trigger 16 which is pivotally connected to the side wall 12 by a pin 17 and tensioned by a spring 18 having a portion 27 to normally keep the end 15 up out of engagement with the slot 14 in the raised position of member 13 which constitutes the open position. The side wall 12 is provided with the hole 19 to which is fastened a fishing line 20, the loop 21 of the weight 22 is passed into the space 23 below the raised member 13 which is arranged parallel to and spaced from the base and the end 15 of the trigger 16 is pressed downwardly to engage and hold the loop 21 and project through an aperture 11' in the base when an Aspirin or similar dissolvable tablet 24 is placed in between the curved portion 25 of the trigger 16 and the base 11 as shown in the drawings. Two methods are shown for using the trigger unit and are not to be considered as a limitation of its use as it is appreciated that other methods of use could be used without deviating from its general scope. In Figure 1, the trigger mechanism is shown being used with a rod 30, line 20 and a lure 37, constituting artificial bait. Figure 2 shows the trigger used with a spreader 28 bait rig for drift fishing, and having a float 29 attached to the line 20 and rod 30.

The device operates as follows: The trigger is cocked, and the loop 21 of the weight 22 is passed over the end 15 of the trigger 16 which passes through the slots 14 and 11' and is retained in this position by placing an aspirin or similar dissolvable tablet in the space provided at the other end of the base 11, the device is fastened onto the line, and the cast is made in the conventional manner. As the device strikes the water, the tablet 24 begins to dissolve, and in a matter of seconds, the device releases the weight, and the retrieve is begun.

While but two general forms of the invention are shown in the drawings and described in the specification, it is not desired to limit this application for patent to these particular forms as it is appreciated that other forms could be made that would use the same principles and come within the scope of the appended claims.

Having thus described the invention, what is claimed is:

1. A casting-off device for detachably securing a weight to a fishing line, said casting-off device including a base portion, a raised portion arranged parallel to and spaced from said base portion and having an opening therein, a trigger element having a pair of opposite ends, one of said ends being shaped to pass through said opening in one position of said element to releasably secure said weight to said trigger element, a pivot structure for pivotally securing said trigger element to said base portion, resilient means urging said trigger element from said one position, said base including means for holding a water soluble element in position to react against the opposite end of said trigger element in opposition to said resilient means to maintain said trigger element in said one position.

2. A casting-off device of the type set forth in claim 1, in which said pivot structure includes a side wall portion extending from said base portion at an angle thereto and having an opening for receiving a flexible element for securing said device to said fishing line, and a pivot element projecting from said side wall portion through said trigger element.

3. A structure of the type set forth in claim 2, in which said resilient means includes a spring strip having an intermediate portion wrapped around said pivot element and its opposite ends reacting against said trigger element and said base portion, respectively.

References Cited in the file of this patent

UNITED STATES PATENTS

| | | |
|---|---|---|
| 348,697 | Shenfield et al. | Sept. 7, 1886 |
| 1,636,914 | Kollstede | July 26, 1927 |
| 2,308,238 | Baker | Jan. 12, 1943 |

FOREIGN PATENTS

| | | |
|---|---|---|
| 579,591 | France | Oct. 20, 1924 |